(12) United States Patent
Beaupre

(10) Patent No.: US 11,123,896 B2
(45) Date of Patent: Sep. 21, 2021

(54) METHOD AND SYSTEM FOR MIXING CONCRETE CONSTITUENTS IN A DRUM USING A PROBE MOUNTED THEREINSIDE

(71) Applicant: Command Alkon Incorporated, Birmingham, AL (US)

(72) Inventor: Denis Beaupre, ainte-Catherine-de-la-Jacques (CA)

(73) Assignee: Command Alkon Incorporated, Birmingham, AL (US)

(*) Notice: Subject to any disclaimer, the term of this patent is extended or adjusted under 35 U.S.C. 154(b) by 0 days.

(21) Appl. No.: 16/646,087

(22) PCT Filed: Oct. 2, 2018

(86) PCT No.: PCT/US2018/053977
§ 371 (c)(1),
(2) Date: Mar. 10, 2020

(87) PCT Pub. No.: WO2019/070715
PCT Pub. Date: Apr. 11, 2019

(65) Prior Publication Data
US 2020/0282597 A1    Sep. 10, 2020

Related U.S. Application Data

(60) Provisional application No. 62/567,487, filed on Oct. 3, 2017.

(51) Int. Cl.
*B28C 7/02* (2006.01)
*B28C 5/08* (2006.01)
*B28C 5/42* (2006.01)

(52) U.S. Cl.
CPC ............ *B28C 7/024* (2013.01); *B28C 5/0812* (2013.01); *B28C 5/422* (2013.01)

(58) Field of Classification Search
CPC ....... B28C 7/024; B28C 5/0812; B28C 5/422; C04B 40/0028; B02C 7/02–7/028
See application file for complete search history.

(56) References Cited

U.S. PATENT DOCUMENTS 4,900,154 A * 2/1990 Waitzinger ........... G01N 33/383
366/56
5,752,768 A    5/1998 Assh
(Continued)

FOREIGN PATENT DOCUMENTS

EP         0924040       6/1999
WO       2017/07223      5/2017
(Continued)

OTHER PUBLICATIONS

International Search Report and Written Opinion for PCT/2018/053977, dated Nov. 30, 2018.

*Primary Examiner* — Charles Cooley
(74) *Attorney, Agent, or Firm* — Wiley Rein LLP

(57) ABSTRACT

A method for mixing concrete constituents that generally has a step of rotating a drum having a probe mounted inside the drum and immerged in the concrete constituents being mixed inside the drum; a step of receiving a first set of pressure values indicative of pressure exerted on the probe by the concrete constituents, the pressure values of the first set being taken at different circumferential positions of the probe during a single rotation of the drum; a step of determining a deviation of the pressure values of the first set from reference data; and a step of reducing a rotation speed of the drum upon determining that the deviation is lower than a threshold value.

19 Claims, 12 Drawing Sheets

(56) References Cited

U.S. PATENT DOCUMENTS

| | | | |
|---|---|---|---|
| 8,746,954 B2 | 6/2014 | Cooley et al. | |
| 8,858,061 B2 | 10/2014 | Berman | |
| 9,199,391 B2* | 12/2015 | Beaupre | B28C 7/024 |
| 9,702,863 B2* | 7/2017 | Beaupre | B28C 5/422 |
| 10,041,928 B2* | 8/2018 | Berman | G01N 11/00 |
| 10,989,643 B2* | 4/2021 | Beaupre | G01N 29/4427 |
| 2009/0171595 A1 | 7/2009 | Bonilla Benegas | |
| 2012/0204625 A1* | 8/2012 | Beaupre | G01N 11/14 |
| | | | 73/54.31 |
| 2015/0298351 A1* | 10/2015 | Beaupre | B28C 7/0418 |
| | | | 366/7 |
| 2015/0355160 A1* | 12/2015 | Berman | G01N 11/14 |
| | | | 73/54.03 |
| 2016/0025700 A1* | 1/2016 | Beaupre | B28C 7/02 |
| | | | 73/433 |
| 2017/0108421 A1* | 4/2017 | Beaupre | G01N 11/10 |
| 2017/0173822 A1* | 6/2017 | Beaupre | B28C 5/4231 |
| 2019/0204197 A1* | 7/2019 | Beaupre | G01N 29/024 |
| 2019/0242802 A1* | 8/2019 | Beaupre | G01N 11/00 |
| 2020/0078987 A1* | 3/2020 | Beaupre | B28C 7/024 |
| 2020/0225258 A1* | 7/2020 | Beaupre | G01P 3/48 |
| 2020/0232966 A1* | 7/2020 | Beaupre | G01N 9/16 |
| 2020/0282597 A1* | 9/2020 | Beaupre | B28C 5/0812 |
| 2021/0001765 A1* | 1/2021 | Beaupre | B28C 5/422 |
| 2021/0031408 A1* | 2/2021 | Beaupre | B28C 5/422 |
| 2021/0055195 A1* | 2/2021 | Beaupre | B28C 7/024 |

FOREIGN PATENT DOCUMENTS

| | | | |
|---|---|---|---|
| WO | 2017/099711 | 6/2017 | |
| WO | WO-2019157172 A2 * | 8/2019 | G01N 33/383 |

* cited by examiner

METHOD AND SYSTEM FOR MIXING CONCRETE CONSTITUENTS IN A DRUM USING A PROBE MOUNTED THEREINSIDE

FIELD

The improvements generally relate to the field of concrete production, and more particularly relate to the mixing of concrete constituents to one another into a rotating drum to obtain fresh concrete.

BACKGROUND

It is known that after loading concrete constituents (e.g., cement, aggregate and water) inside a drum, the drum has to be rotated at a higher rotation speed in order to mix the concrete constituents to one another for a given period of time. Once it is determined that the concrete constituents have reached a certain level of homogeneity, the rotation speed of the drum is generally reduced to a lower rotation speed, until the fresh concrete is poured.

For instance, International Patent Publication No. WO 2017/099711 A1 (hereinafter the '711 application) describes one technique for determining homogeneity of concrete constituents which includes monitoring a pressure or force value associated with rotating the drum at a constant rotation speed, and confirming that the average pressure or force value over two or more successive drum rotations does not vary from one rotation to the next. The '711 application also describes another technique including measuring a pressure or force value associated with rotating the drum at a constant rotation speed, and confirming that the instantaneous pressure or force value at an initial point in time does not vary from the instantaneous pressure or force value at a point one revolution from the initial point.

Although such existing techniques are satisfactory to a certain extent, there remains room for improvement.

SUMMARY

Existing techniques such as the ones described above have the drawback of relying on measurements performed over a plurality of drum rotations, which can cause unnecessary resources to be spent rotating the drum at the higher rotation speed waiting for the monitored force or pressure value to settle over the plurality of drum rotations when in fact the concrete constituents are already satisfactorily mixed to one another inside the drum.

Accordingly, there are provided methods and systems which can determine that the concrete constituents are satisfactorily mixed to one another in the drum based on measurements taken in a single drum rotation. Such methods and systems allow reducing the rotation speed of the drum as soon as it is determined that the concrete constituents are well mixed to one another, which can provide savings both in terms of fuel and time. For instance, in the context of mixer trucks, fuel can be saved as rotating the drum at the lower rotation speed is significantly less costly than rotating the drum at the higher rotation speed. Further, time can be saved as the mixer truck is typically allowed to leave towards the client only when the rotation speed of the drum is reduced, to avoid accidents.

In accordance with one aspect, there is provided a method for mixing concrete constituents comprising: rotating a drum having a probe mounted inside the drum and immerged in the concrete constituents being mixed inside the drum; receiving a first set of pressure values indicative of pressure exerted on the probe by the concrete constituents, the pressure values of the first set being taken at different circumferential positions of the probe during a single rotation of the drum; determining a deviation of the pressure values of the first set from reference data; and reducing a rotation speed of the drum upon determining that the deviation is lower than a threshold value.

In accordance with another aspect, there is provided a system for mixing concrete constituents inside a drum, the system comprising: a probe mounted inside the drum, extending in a radial orientation of the drum and being moved circumferentially as the drum rotates, and onto which a pressure is imparted by resistance due to the movement of the probe in the concrete constituents by the rotation of the drum; and a computing device communicatively coupled with the probe, the computing device being configured for performing the steps of: receiving a first set of pressure values indicative of pressure exerted on the probe mounted inside the drum and immerged in the concrete constituents being mixed inside the drum, the pressure values of the first set corresponding to different circumferential positions of the probe during a single rotation of the drum; determining a deviation of the pressure values of the first set from reference data; and generating a signal based on a comparison between the deviation and a threshold value.

In accordance with another aspect, there is provided a computer-implemented method for mixing of concrete constituents being mixed inside a drum, the computer-implemented method comprising: receiving a first set of pressure values indicative of pressure exerted on a probe mounted inside the drum and immerged in the concrete constituents being mixed inside the drum, the pressure values of the first set corresponding to different circumferential positions of the probe during a single rotation of the drum; determining a deviation of the pressure values of the first set from reference data; and generating a signal based on a comparison between the deviation and a threshold value.

In accordance with another aspect, there is provided a method for mixing concrete constituents comprising: rotating a drum having a probe mounted inside the drum and immerged in the concrete constituents being mixed inside the drum; receiving a first set of pressure values indicative of pressure exerted on the probe by the concrete constituents, the pressure values of the first set being taken at different circumferential positions of the probe during a single rotation of the drum; determining a deviation of the pressure values of the first set from reference data; and generating a signal based on a comparison between the deviation and a threshold value.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
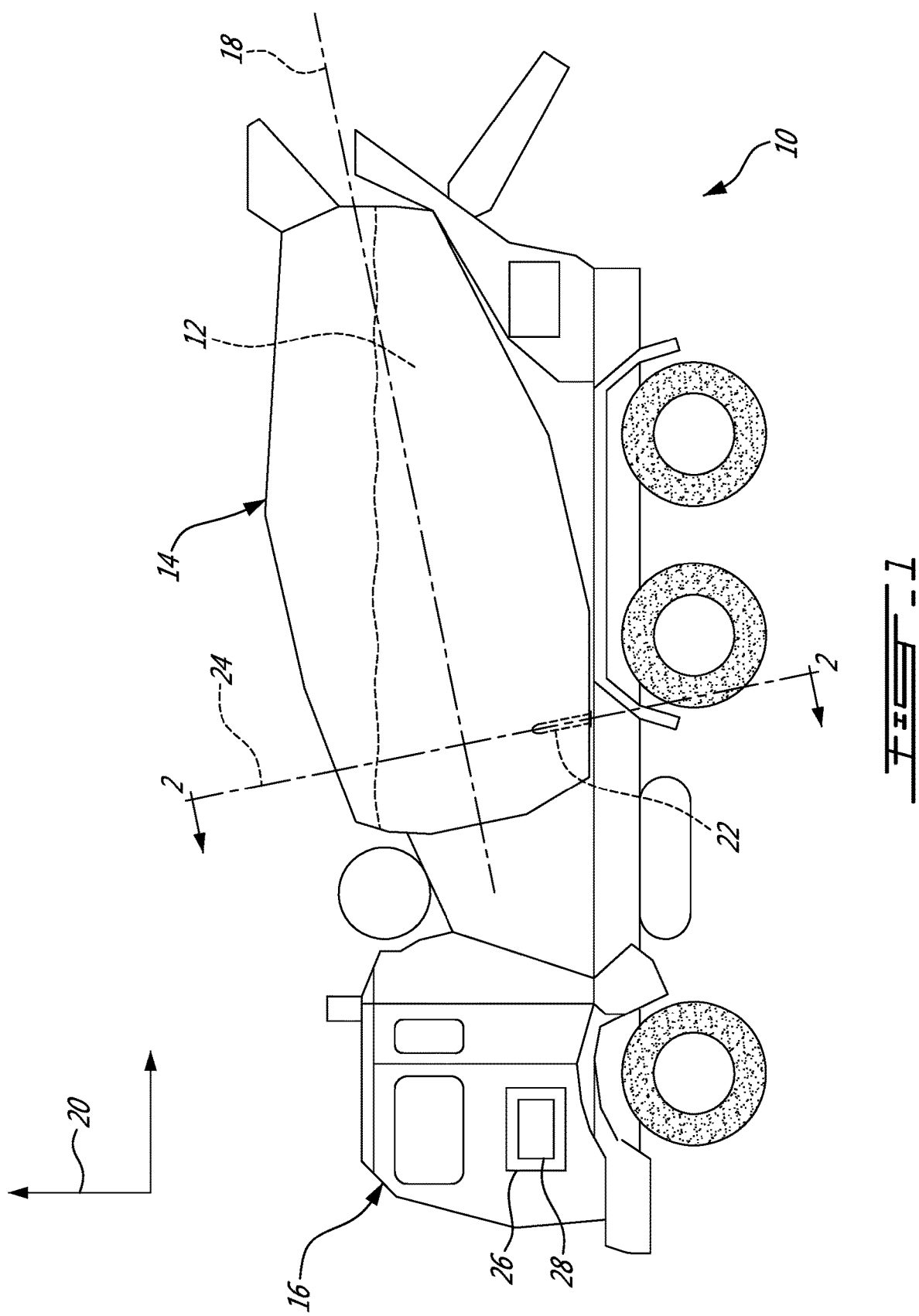
FIG. 1 is a side elevation view of an example of a system for mixing concrete constituents inside a drum of a mixer truck, in accordance with an embodiment.

FIG. 1 shows an example of a system 10 for mixing concrete constituents 12 inside a drum 14. In this specific example, the drum 14 is rotatably mounted to a mixer truck 16 where the drum 14 can be rotated about a rotation axis 18 which is at least partially horizontally-oriented relative to the vertical 20. However, the drum does not need to be rotatably mounted to a mixer truck. For instance, the drum can be part of a stationary concrete mixer such as those provided in concrete production plants.

As depicted in this example, the system 10 has a probe 22 which is mounted inside the drum 14 and extends in a radial orientation 24 of the drum 14. The probe 22 is configured to measure pressure values as the probe 22 is moved circumferentially in the concrete constituents 12 by the rotation of the drum 14 about the rotation axis 18. As the probe 22 is so moved, it reaches a plurality of circumferential positions, which can be associated with corresponding ones of the pressure values measured by the probe 22. A potential example of the probe 22 is described in international patent publication no. WO 2011/042880.

The system has a computing device 26 which is communicatively coupled with the probe 22 so that the computing device 26 can receive the pressure values measured by the probe 22 and, optionally, the corresponding circumferential positions $\Theta$. The communication between the computing device 26 and the probe 22 can be provided by a wireless connection, a wired connection, or a combination thereof.

As will be described below, the computing device 26 can determine that the concrete constituents are satisfactorily mixed inside the drum 14 based on at least two pressure values received from the probe 22 during a single rotation of the drum 14. The computer device 26 then determines a deviation of the at least two pressure values from reference data. When it is determined that the deviation is lower than a threshold value, the rotation speed of the drum can be reduced to save costs. Alternatively, when it is determined that the deviation is lower than a threshold value, a signal which causes for instance the rotation speed of the drum to be reduced can be generated. Otherwise, the rotation of the drum 14 at the high rotation speed is maintained and pressure values are measured during each subsequent drum rotation until it is determined that the deviation is lower than the threshold value.

In this specific embodiment, the system 10 has a user interface 28 which is communicatively coupled with the computing device 26 and configured to display that the concrete constituents 12 are satisfactorily mixed or not and/or instructions to reduce the rotation speed of the drum 14. The status of the mixing of the concrete constituents 12 can also be displayed in real time on the user interface 28 or be stored on a memory of the computing device 26 for display at a later time or on another user interface. In some embodiments, the deviation from the reference data is displayed so that a user can follow the mixing of the concrete constituents in real time.

Figure 2:
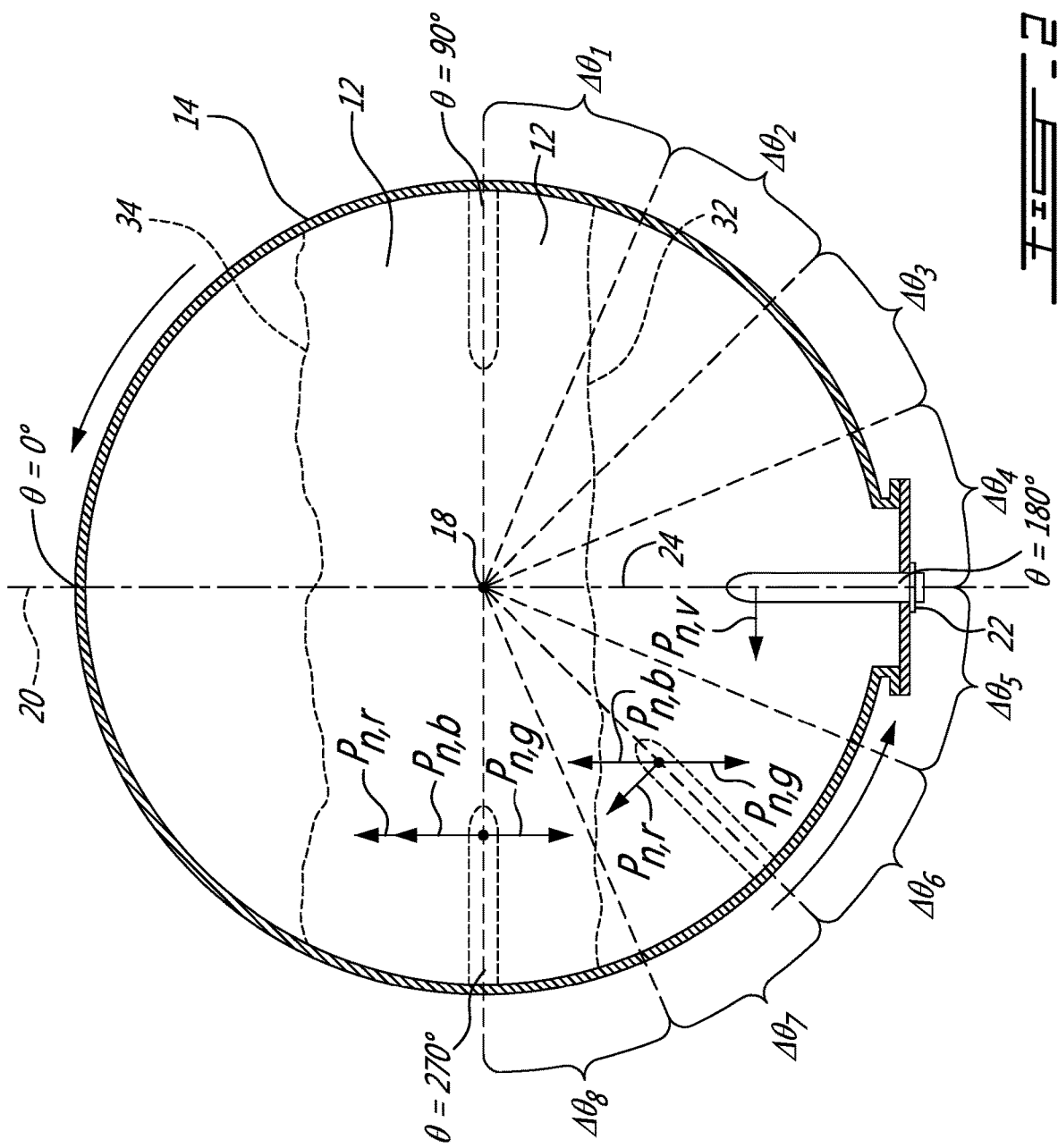
FIG. 2 is a sectional view taken along line 2-2 of FIG. 1.

As best seen in FIG. 2, the probe 22 extends in a radial orientation 24 of the drum and reaches a plurality of circumferential positions $\Theta$ as the drum 14 rotates about the rotation axis 18. More specifically, in this illustrated example, the probe 22 is at a circumferential position $\Theta$ of 0° when at the top of the drum 14, at a circumferential position of 90° when at the right of the drum 14, at a circumferential position of 180° when at the bottom of the drum 14, and at a circumferential position of 270° when at the left of the drum 14. Such definition of the circumferential positions $\Theta$ is exemplary only as the circumferential positions $\Theta$ could have been defined otherwise depending on the embodiment.

At each of the circumferential positions $\Theta$, the probe 22 measures a pressure value and transmits the pressure value to the computing device 26. The computing device 26 receives pressure values of a first set indicative of pressure exerted on the probe by the concrete constituents 12 at different circumferential positions, and taken during a single rotation of the drum 14.

The pressure values of the first set can be successive pressure values measured when the probe 22 is moved in a first circumferential range $\Delta\Theta 1$. The number of pressure values of the first set can depend on a frequency at which they are measured (e.g., 60 measurements per second), on a span of the first circumferential range $\Delta\Theta 1$ (e.g., 22.5°) and/or on a rotation speed of the drum 14 (e.g., >10 RPM).

In some embodiments, the computer device 26 receives pressure values of a second set that are indicative of pressure exerted on the probe 22 by the concrete constituents 12 when the probe 22 is moved in a second circumferential range $\Delta\Theta 2$ during the single rotation of the drum. In these embodiments, the second circumferential range $\Delta\Theta 2$ is chosen to be different from the first circumferential range $\Delta\Theta 1$, which allows determining a deviation of the pressure values of the second set from corresponding reference data. In this way, the determination of whether the concrete constituents are well mixed or not can depend on two sets of pressure values, which deviation can be independently compared to a corresponding threshold value.

In some other embodiments, the computer device 26 receives pressure values of at least three sets that are indicative of pressure exerted on the probe 22 by the concrete constituents 12 when the probe is moved in corresponding circumferential ranges.

In the illustrated embodiment of FIG. 2, pressure values from eight different circumferential ranges are received. More specifically, this example shows a first circumferential range $\Delta\ominus 1$ spanning from 90° to 112.5° where pressure values of a first set are measured; a second circumferential range $\Delta\ominus 2$ spanning from 112.5° to 135° where pressure values of a second set are measured; a third circumferential range $\Delta\ominus 3$ spanning from 135° to 157.5° where pressure values of a third set are measured; a fourth circumferential range $\Delta\ominus 4$ spanning from 157.5° to 180° where pressure values of a fourth set are measured; a fifth circumferential range $\Delta\ominus 5$ spanning from 180° to 202.5° where pressure values of a fifth set are measured; a sixth circumferential range $\Delta\ominus 6$ spanning from 202.5° to 225° where pressure values of a sixth set are measured; a seventh circumferential range $\Delta\ominus 7$ spanning from 225° to 247.5° where pressure values of a seventh set are measured; and an eighth circumferential range $\Delta\ominus 8$ spanning from 247.5° to 270° where pressure values of an eighth set are measured.

In such embodiments, the computer device 26 determines a deviation of the pressure values of one, two or more of the sets from corresponding reference data and compares the determined deviation(s) to a same threshold value or to corresponding threshold values.

For instance, in one embodiment, a deviation of the pressure values of the first set of pressure values and a deviation of the pressure values of the eighth set of pressure values are determined and compared to a same threshold value T. However, in some other embodiments, a deviation of the pressure values of the first set of pressure values and a deviation of the pressure values of the eighth set of pressure values are determined and compared to a corresponding one of two different threshold values T1 and T8.

As can be understood, even if pressure values of eight different sets are received, pressure values of at least some of the sets can be ignored in determining whether or not the concrete ingredients 12 are satisfactorily mixed. For instance, pressure values of the fourth set and fifth set may be ignored due to discrepancies due to the mixing blade action which reduces the pressure on the probe 22 in the bottom of the drum 14. Alternatively, the circumferential positions at which the pressure values are taken can be selected based on a volume of concrete constituents 12 being mixed inside the drum 14. For instance, in a case where there is a low level 32 of concrete constituents 12 being mixed inside the drum 14, pressure values of the first and eighth sets can show that the probe 12 moves in air, and not in the concrete constituents 12, when positioned at the circumferential positions of the first and eighth circumferential ranges $\Delta\ominus 1$ and $\Delta\ominus 8$. Accordingly, the pressure values of the first and eighth sets can be ignored. In this case, pressure values of the second set, third set, sixth set and seventh set can be preferably used. However, in a case where there is a high level 34 of concrete constituents 12 being mixed inside the drum 14, pressure values of the first set and of the eighth set can be used.

The pressure values that are measured are oriented in a normal orientation with respect to the probe 22. Such pressure values can be referred to as "normal pressure values" and can include a normal contribution Pn, g imparted on the probe 22 by gravity due to a weight of the probe 22, a normal contribution Pn, b imparted on the probe 22 by buoyancy due to a volume of the probe 22 when the probe 22 is submerged in the concrete constituents 12 and a normal contribution Pn, r imparted on the probe 22 by resistance due to the movement of the probe 22 in the concrete constituents 12 by the rotation of the drum 14.

FIG. 2 shows normal contributions Pn, g, Pn, b, Pn, r by way of force vectors acting on the probe 22 when positioned at different circumferential positions. Understanding how each of these force vectors acts on the probe 22 can be useful in determining the deviation of pressure values of a given set from reference data, and more specifically, in determining the reference data which best apply in each situation.

For instance, the gravity that may act on the probe 22 during rotation of the drum 14 is discussed. As can be understood, the gravity acting on the probe 22 can be similar notwithstanding in which material the probe 22 is moved in. For instance, the gravity acting on the probe 22 will likely be similar when the probe 22 is moved in fresh concrete, not yet mixed concrete constituents or air.

More specifically, the gravity depends on a mass m of the probe 22 and on the gravitational acceleration g, and acts on the probe 22 along the vertical 20. Accordingly, the normal contribution Pn, g of the gravity exerted on the probe 22 varies with its circumferential position $\ominus$. For instance, when the probe 22 is horizontally-oriented, e.g., when the probe 22 is at the circumferential position $\ominus=90°$ or $\ominus=270°$, the normal contribution Pn, g of the gravity is either maximal or minimal, as the gravity pulls the probe 22 toward the ground and creates a downward pressure on it. In contrast, when the probe 22 is vertically-oriented, e.g., when the probe 22 is at the bottom of the drum 14 so that its circumferential position is $\ominus=180°$, the normal contribution Pn, g of the gravity is null.

Figure 3:
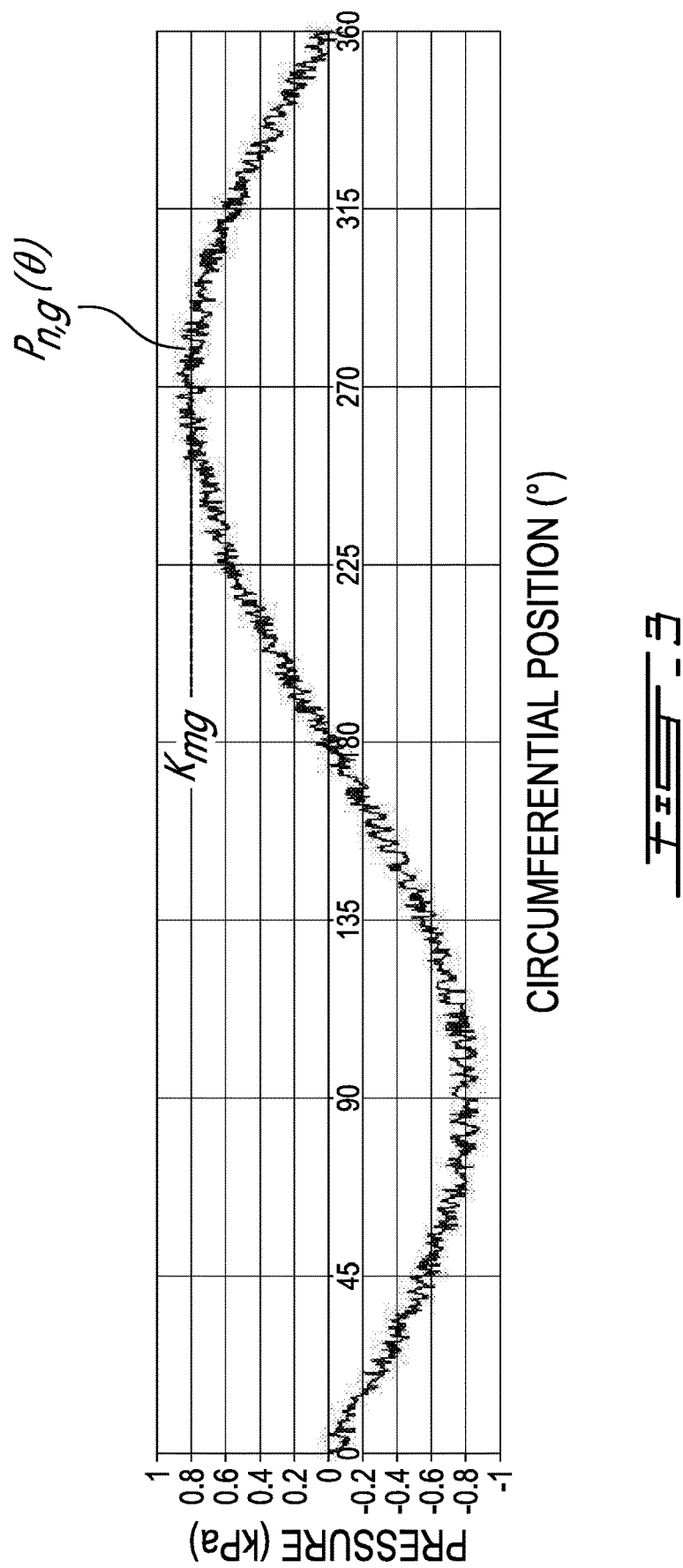
FIG. 3 is an example of a graph showing a normal contribution of gravity measured by the probe during a rotation of a drum.

FIG. 3 shows an example relationship between the normal contribution Pn, g of the gravity exerted on the probe as a function of the circumferential position $\ominus$ of the probe 22 when the drum 14 is empty. As can be seen, the normal contribution Pn, g ($\ominus$) of the gravity exerted on the probe 22 during a drum rotation varies as:

$$Pn,g(\ominus) = -K_{mg} \sin \ominus, \quad (1)$$

where $K_{mg}$ is a constant which depends on the weight of the probe, i.e. on the mass m of the probe and on the gravitational acceleration g of earth, and $\ominus$ is the circumferential position of the probe. Because of the change in orientation and sign convention, the pressure value measured by the probe is negative at the circumferential position 90° and positive in the opposite circumferential position of 270°. A different sign convention may also be used.

In some embodiments, the constant $K_{mg}$ and the corresponding normal contribution Pn, g ($\ominus$) of the gravity of a given probe 22 in a given drum 14 can be obtained by measuring the pressure values Pn, g as the drum 14 rotates over the circumferential positions $\ominus$ when the drum 14 is empty (e.g., filled with air). Such data can be recorded and stored for later use as calibration data for the given probe 22 and the given drum 14. For instance, the normal contribution Pn, g ($\ominus$) of gravity can be subtracted from raw pressure measurements of the probe to obtain "weight compensated" (WC) pressure values $Pn,_{WC}$. When the pressure values are so weight compensated, the probe 22 can measure pressure values of $\ominus$ with a given precision when the probe 22 in an empty drum. Because the probe 22 can wear with time and its weight and surface can be reduced, it is possible to adjust the weight compensation to account for the wear of the probe 22 over time.

In some other embodiments, the probe 22 is configured to mechanically compensate its own weight when moved circumferentially as the drum 14 rotates, an example of which is described in International Patent Publication No. WO 2014/138968. Accordingly, when the drum 14 is empty, the pressure values measured by such a probe are constant over the plurality of circumferential positions ⊖. In these embodiments, the relationship between the normal contribution of the gravity exerted on the probe as a function of the circumferential position of the probe would be null or near null for all circumferential positions ⊖. In these cases, the constant $K_{mg}$ and the normal contribution of gravity can thus be ignored, and the raw pressure measurements of the probe can also be considered "weight compensated" pressure values $Pn,_{WC}$.

In alternate embodiments, the rotation axis of the drum can be vertical, in which case the gravity acting on the probe 22 would yield no normal contribution and thus remains unmeasured by the probe 22 during the rotation of the drum.

The following paragraphs describe the buoyancy that may act on the probe 22 during rotation of the drum 14 into fresh concrete. However, such buoyancy can behave in a similar way when the probe 22 is moved into not yet mixed concrete constituents 12 instead of fresh concrete, although with more variability due to the presence of localized heterogeneities in the concrete constituents 12.

More specifically, the buoyancy depends on a density D of the fresh concrete displaced by the probe 22 and on a volume V of the probe 22, and acts on the probe 22 along the vertical 20. Accordingly, the normal contribution Pn, b of the buoyancy exerted on the probe 22 varies with its circumferential position ⊖. For instance, when the probe 22 is horizontally-oriented, e.g., when the probe 22 is at the circumferential position ⊖=90° or ⊖=270°, the normal contribution Pn, b of the buoyancy is either maximal or minimal. In contrast, when the probe 22 is vertically oriented, i.e. when the probe 22 is at the circumferential position ⊖=180°, the normal contribution Pn, b of the buoyancy is null. As can be understood, as the probe 22 can have a high volume and as the density of the fresh concrete can be high, the normal contribution Pn, b of buoyancy on the probe can be significant, especially when the pressure values measured by the probe 22 are weight compensated.

Figure 4:
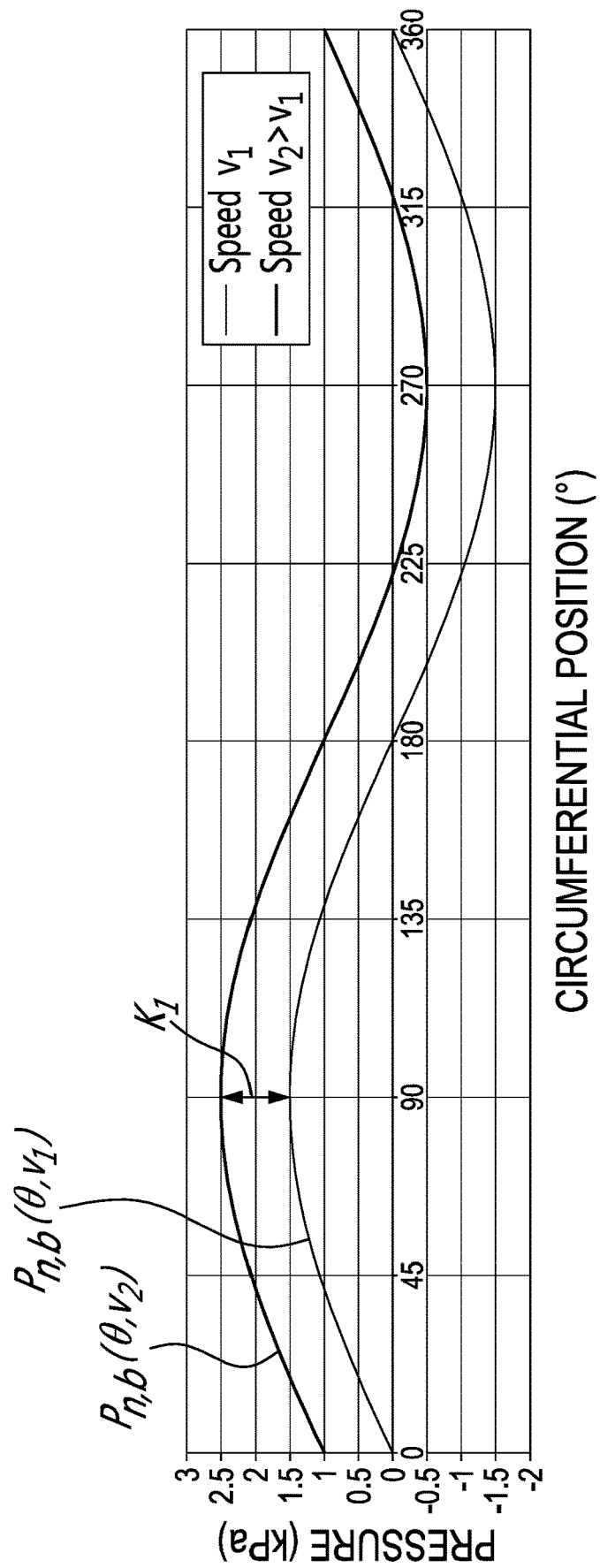
FIG. 4 is an example of a graph showing, for two different rotation speeds of a drum, normal contributions of buoyancy measured by the probe when submerged into water during a rotation of a drum at a corresponding one of the two rotation speeds of the drum, after mathematically discounting the normal contribution of gravity.

FIG. 4 shows an example relationship between the normal contribution Pn, b of the buoyancy exerted on the probe 22 as a function of its circumferential position ⊖ when the probe 22 is submerged into water (having a known density of 1 g/cm³) when the weight of the probe 22 has been compensated as described above. As can be seen, the normal contribution ⊖ of the buoyancy exerted on the probe 22 varies as:

$$Pn,b(\ominus) = K_v D \sin \ominus, \quad (2)$$

where $K_v$ is a constant which depends on a volume V of the probe 22, D is the density of the displaced fluid, i.e. the fresh concrete in this example, and ⊖ is the circumferential position of the probe 22. Equation (2) assumes that there is no restriction due to the existence of any yield stress.

The constant $K_v$ associated with a given probe can be determined during a calibration step in which the probe 22 is moved inside a drum 14 filled with a fluid having a known density and during which weight compensated pressure values Pn, b (⊖) are measured by the probe, such as the one shown in FIG. 4. In this example, the constant $K_v$ can be determined by computing $K_v = Pn, b(\ominus i)/(D_{water} \sin \ominus i)$ wherein ⊖i is any circumferential position of the probe 22. As the constant $K_v$ is associated with the construction of the probe 22, and not with the fluid in which the probe is submerged, the constant $K_v$ will remain the same regardless of the type of fluid in which the probe 22 is submerged.

For instance, the normal contribution Pn, b (⊖) of buoyancy can be determined based on a given density D of the fresh concrete and on the constant $K_v$ which depends on the volume V of the probe 22. Then, the normal contribution Pn, b (⊖) can be subtracted from raw pressure measurements of the probe to obtain "buoyancy compensated" (BC) pressure values $Pn,_{BC}$. When the pressure values are so buoyancy compensated, the probe 22 can measure pressure values of 0 within a given tolerance when the probe 22 moves in fresh concrete of the given density D. Because the probe 22 can wear with time and its volume can be reduced, it is possible to adjust the buoyancy compensation to account for the wear of the volume V of the probe 22 over time.

In some other embodiments, the probe 22 is configured to mechanically compensate its own buoyancy when moved circumferentially as the drum 14 rotates. Accordingly, when the drum 14 rotates in the fresh concrete of the given density D inside the drum 14, the pressure values measured by the probe are constant over the plurality of circumferential positions ⊖. In these embodiments, the relationship between the normal contribution of the buoyancy exerted on the probe 22 as a function of the circumferential position ⊖ of the probe 22 would be null or near null for all circumferential positions ⊖. In these cases, the raw pressure measurements of the probe can also be considered "buoyancy compensated" pressure values $Pn,_{BC}$.

In alternate embodiments, the rotation axis of the drum can be vertical, in which case the buoyancy acting on the probe 22 would yield no normal contribution and thus remains unmeasured by the probe 22 during the rotation of such drum.

The following paragraphs describe the resistance that may act on the probe 22 during rotation of the drum 14 into fresh concrete. However, such resistance can behave in a similar fashion when the probe 22 is moved into not yet mixed concrete constituents instead of fresh concrete, although with more variability due to the presence of localized heterogeneities in the concrete constituents.

The resistance exerted on the probe 22 by the fresh concrete acts on the probe 22 in a normal orientation. Accordingly, the normal contribution Pn, r of the resistance exerted on the probe 22 by the fresh concrete is constant for all circumferential positions ⊖ when the probe 22 is moved in the fresh concrete at any given rotation speed (e.g., v1, v2). For instance, during a rotation of the drum 14, the resistance considerably increases as the probe 22 enters in the fresh concrete, stays constant during its passage in the fresh concrete, and then considerably decreases as the probe 22 exits the fresh concrete.

Figure 5:
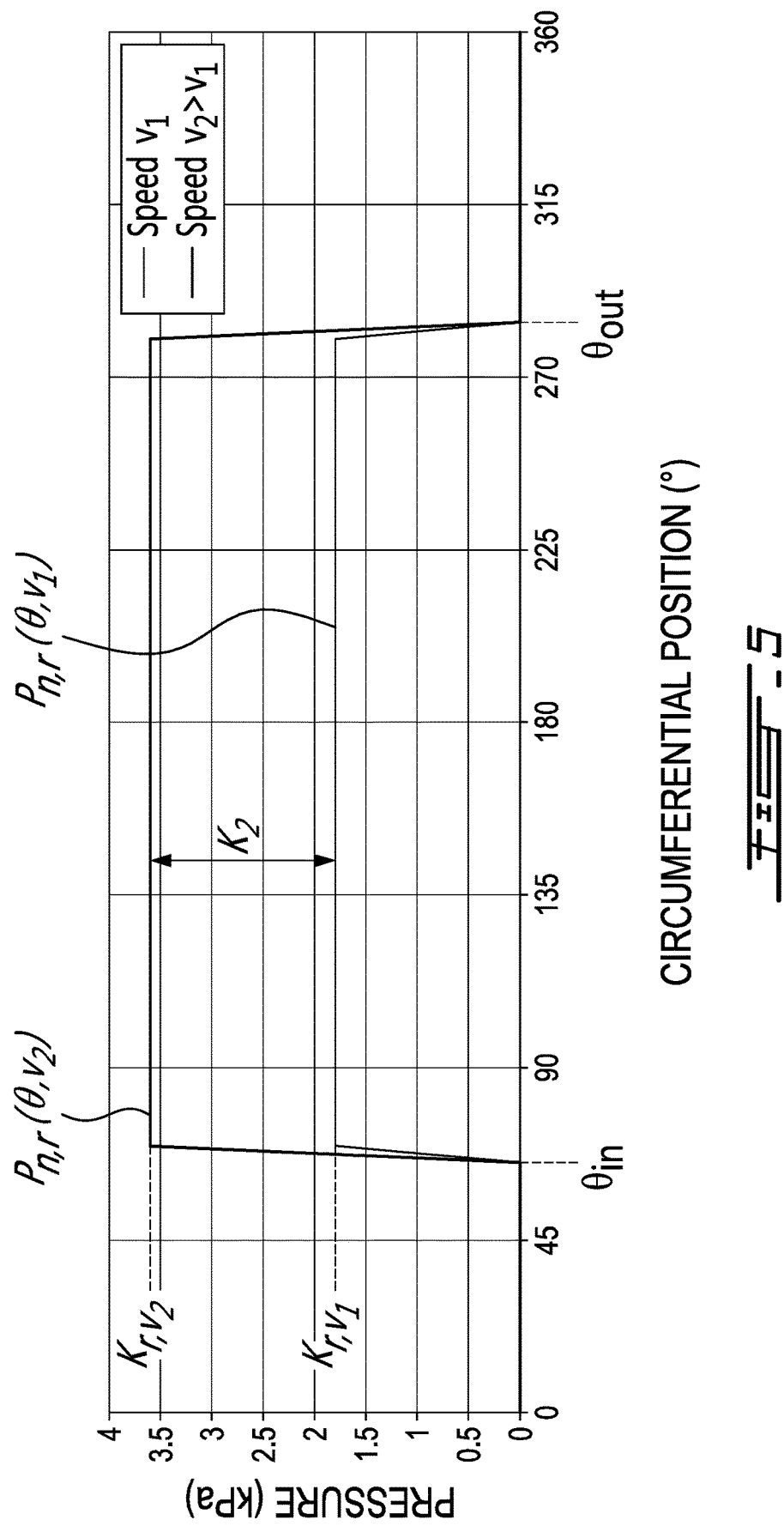
FIG. 5 is an example of a graph showing, for two different rotation speeds of a drum, normal contributions of resistance exerted on the probe by the movement of the probe into fresh concrete during a rotation of a drum at a corresponding one of the two rotation speeds of the drum.

FIG. 5 shows an example relationship between the normal contribution Pn, r of the resistance exerted on the probe 22 by the fresh concrete as a function of its circumferential position ⊖ when the probe 22 is submerged into the fresh concrete and without the normal contribution Pn, g of gravity and the normal contribution Pn, b of buoyancy. As can be seen, the normal contribution Pn, r of the resistance exerted on the probe 22 by the fresh concrete varies as:

$$Pn,r(\ominus) = K_R \text{ for } \ominus_{in} < \ominus < \ominus_{out}, \text{ and} \quad (3)$$

$$Pn,r(\ominus) = 0 \text{ for } \ominus < \ominus_{in} \text{ and } \ominus > \ominus_{out}, \quad (4)$$

wherein $K_R$ is a constant indicative on the normal resistance exerted on the probe 22 by the fresh concrete when the probe 22 is moved inside the fresh concrete at a given rotation speed v, $\ominus$ in is the circumferential position at which the probe 22 enters the fresh concrete, and $\ominus$out is the circumferential position at which the probe 12 exits the fresh concrete. The constant $K_R$ depends on the rotation speed v of the drum 14 and on a workability of the fresh concrete. As can be understood, $\ominus$ in and $\ominus$out depend on the amount of fresh concrete inside the drum.

Theoretically, the probe 22 can measure raw pressure values Pn, raw ($\ominus$) which are indicative of the normal contributions of gravity, buoyancy and resistance as follows:

$$Pn,\text{raw}(\ominus) = Pn,g(\ominus) + Pn,b(\ominus) + Pn,r(\ominus). \tag{5}$$

Figure 6:
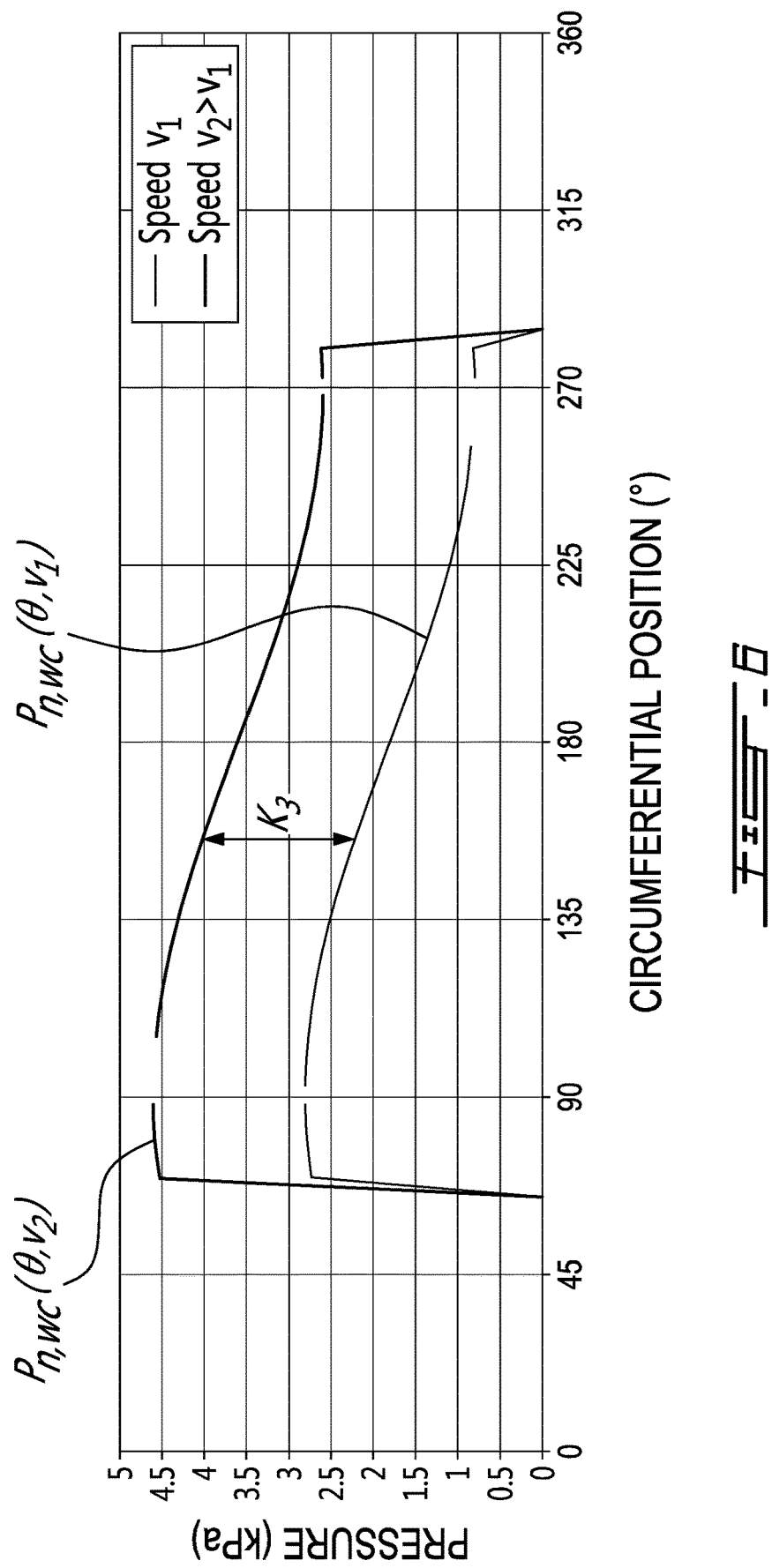
FIG. 6 is an example of a graph showing, for two different rotation speeds of a drum, normal contributions of buoyancy and resistance exerted on the probe by the movement of the probe into fresh concrete during a rotation of a drum at a corresponding one of the two rotation speeds of the drum.

FIG. 6 shows an example relationship between the normal contributions of buoyancy and resistance as a function of the circumferential position $\ominus$ when the probe is submerged into the fresh concrete, without the normal contribution Pn, g of gravity. As can be seen, such weight compensated pressure values $Pn,_{WC}(\ominus)$ are given by:

$$Pn,_{WC}(\ominus) = Pn,\text{raw}(\ominus) - Pn,g(\ominus). \tag{6}$$

By substituting equation (5) in equation (6), one can obtain:

$$Pn,_{WC}(e) = Pn,b(\ominus) + Pn,r(\ominus). \tag{7}$$

Figure 7:
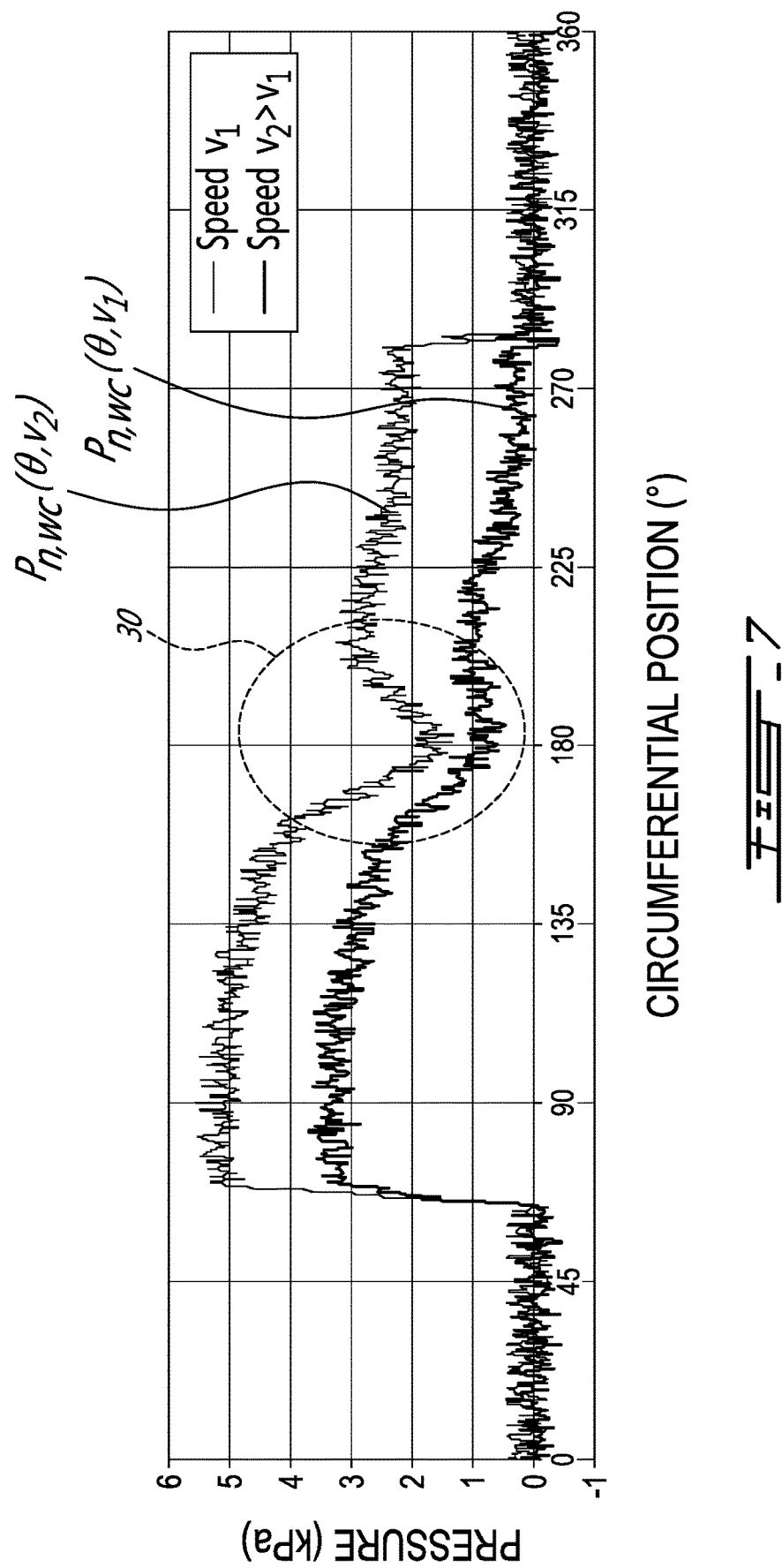
FIG. 7 is an example of a graph showing, for two different rotation speeds of a drum, experimental normal contributions of buoyancy and resistance exerted on the probe by the movement of the probe into fresh concrete during a rotation of a drum at a corresponding one of the two rotation speeds of the drum, with discrepancies for pressure values measured in the vicinity of the bottom of the drum.

FIG. 7 shows an example of an experimental relationship between the normal contributions $Pn,_{WC}(\ominus)$ of buoyancy and resistance as a function of its circumferential position when the probe is submerged into well mixed fresh concrete, without the normal contribution of gravity. One difference between the theoretical data plotted in FIG. 6 and the experimental data plotted in FIG. 7 is that the pressure values measured when the probe 22 is in the vicinity of the bottom of the drum, i.e. near the circumferential position $\ominus = 180°$, have some discrepancies 30 from what would be theoretically expected. These discrepancies 30 can stem from some movement of the fresh concrete along the rotation axis 18 of the drum 14 due to the mixing blade action which reduces the pressure on the probe 22.

As can be understood, it can be expected that the pressure values measured as the probe 22 moves into not yet mixed concrete constituents 12 during a rotation of the drum 14 can be noisier versions of the pressure values measured as the probe 22 moves into well mixed fresh concrete. Indeed, during mixing of the concrete constituents 12, the forces acting on the probe 22 remain the same as if the probe 22 was moved into fresh concrete. However, the presence localized heterogeneities, or lack of homogeneity, can result in corresponding variability in the pressure values.

Figure 8A:
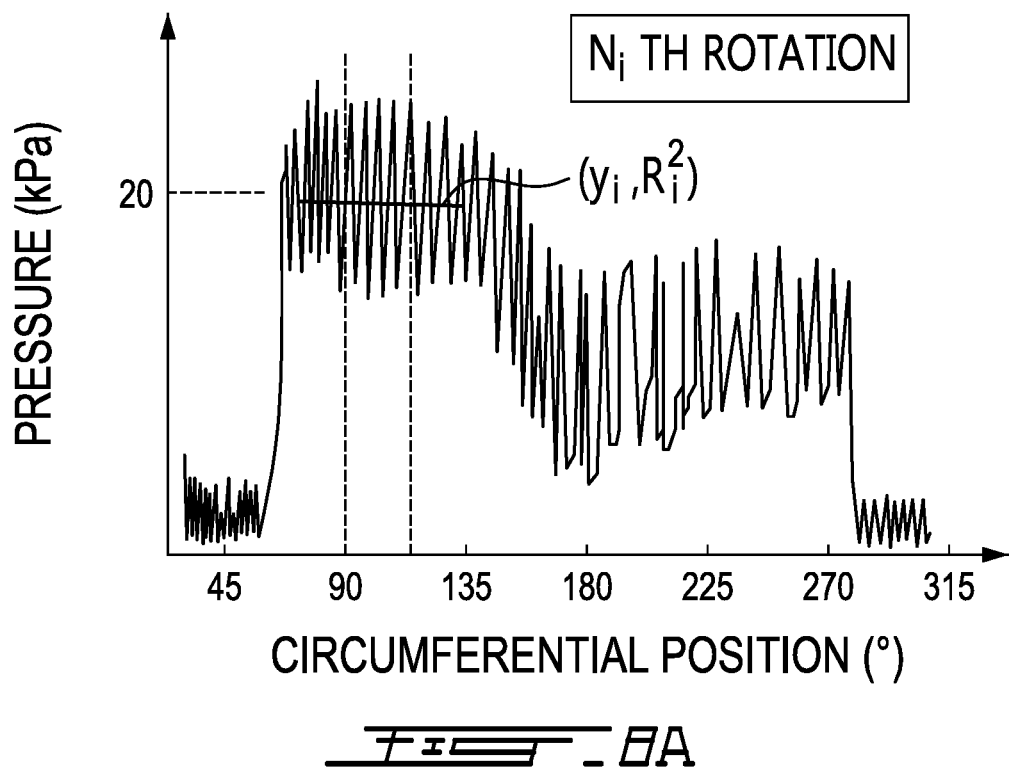
FIGS. 8A and 8B are exemplary graphs showing pressure values as function of the circumferential position of the probe for two different rotations of the drum during mixing of concrete constituents to one another inside the drum.
Figure 8B:
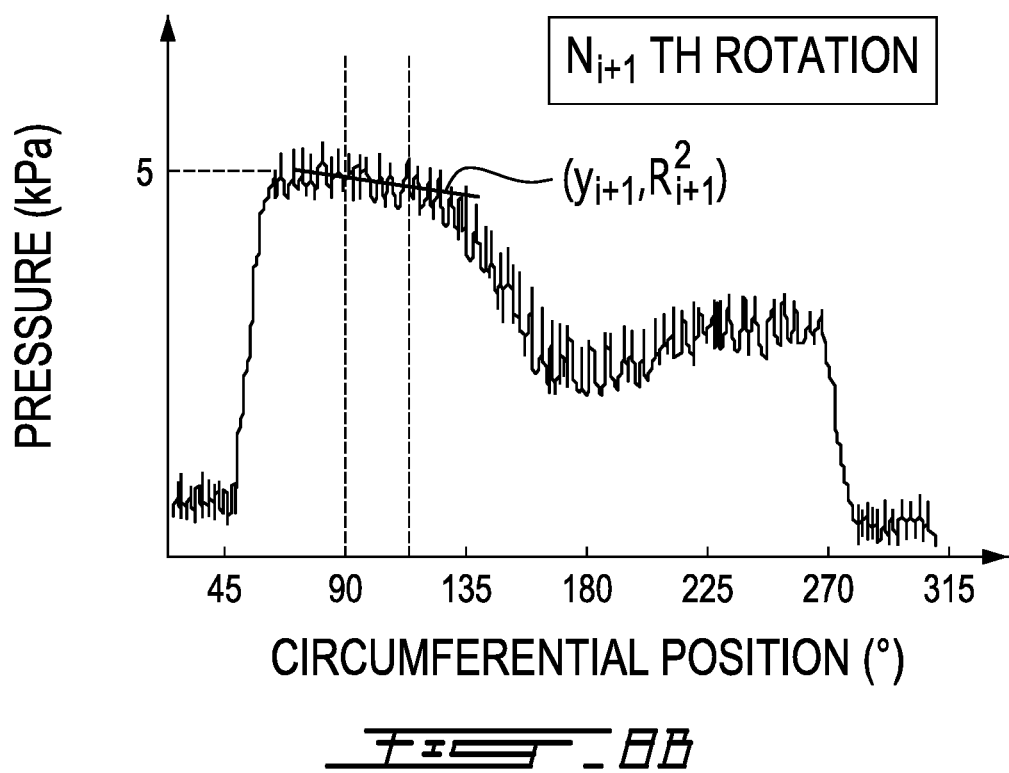

FIGS. 8A and 8B show examples of expected relationships between the normal contributions $Pn,_{WC}(\ominus)$ of buoyancy and resistance as a function of its circumferential position when the probe 22 is submerged into the concrete constituents 12, without the normal contribution of gravity, during two different rotations of the drum 14.

More specifically, FIG. 8A shows pressure values measured by the probe 22 during a $N_i$th rotation of the drum 14 and FIG. 8B shows pressure values measured by the probe 22 during a $N_{i+1}$th rotation of the drum 14, where i is a positive integer.

For instance, in one example, FIG. 8A may show pressure values measured by the probe 22 during a first rotation of the drum 14 and FIG. 8B may show pressure values measured by the probe 22 during a second rotation of the drum 14. However, the drum rotations which are monitored need not be successive drum rotations.

In the example illustrated in FIGS. 8A and 8B, pressure values of a first set spanning from 90° to 112.5° are emphasized between two vertical dashed lines. In this example, during a given rotation of the drum 14, the pressure values of the first set are used to determine a deviation from reference data. In this example, the reference data is a curve best fitted to the pressure values of the first set, and more specifically, the reference data is a linear best fit. The linear best fit is characterized by a coefficient of determined $R^2$, from which a deviation d can be derived. For example, the deviation of the pressure values of the first set can be given by $d = 1 - R^2$. However, it will be understood that the deviation can be determined in any other suitable manner.

For instance, during the $N_i$th rotation of the drum 14, the reference data can thus be determined to be a linear curve $y_i$ that has the form $y_i = m_i \ominus + b_i$, wherein $m_i$ is the slope and $b_i$, is the y-intercept, and is characterized by a coefficient of determination $R_i^2$ of 0.75, which results in a deviation $d_i$ of 0.25. By comparing the deviation $d_i$ of 0.25 to a threshold value of 0.04, it can be determined that the concrete constituents are not yet well mixed, and the rotation speed of the drum 14 can be maintained for at least another rotation.

However, during the $N_{i+1}$th rotation of the drum 14, the reference data can be determined to be a linear curve $y_{i+1}$ that has the form $y_{i+1} = m_{i+1} \ominus + + b_{i+1}$, wherein $m_{i+1}$ is the slope and $b_{i+1}$ is the y-intercept of that curve, and is characterized by a coefficient of determination $R_{i+1}^2$ of 0.98, which results in a deviation $d_{i+1}$ of 0.02. By comparing the deviation $d_{i+1}$ of 0.02 to a threshold value of 0.04, it can be determined that the deviation $d_{i+1}$ of 0.02 is lower than the threshold value of 0.04 and that the concrete constituents 12 are satisfactorily mixed so that the rotation speed of the drum 14 can be reduced. It is noted that the deviation $d_{i+1}$ is determined based on the pressure values measured only in the $N_{i+1}$ th rotation of the drum 14, and that the determination of the deviation $d_{i+1}$ is independent from the pressure values measured in any previous drum rotations, such as the $N_i$th rotation of the drum 14. In this manner, it can be determined that the concrete constituents 12 are well mixed using pressure values measured within only one rotation of the drum 14, as opposed to existing techniques which are based on monitoring a pressure value at one circumferential position (e.g., pressure value of 20 kPa shown in FIG. 8A, pressure value of 5 kPa shown in FIG. 8B) and waiting for this monitored pressure value to settle under a predetermined threshold (e.g., 6 kPa) over a plurality of drum rotations.

As it will be understood, the threshold value of 0.04 is used as an example only. The threshold value can be different from 0.04 in this context. Furthermore, the threshold value can be dynamically modified by the computing device 26 to account for different concrete mixes or different mixing conditions.

Figure 9:
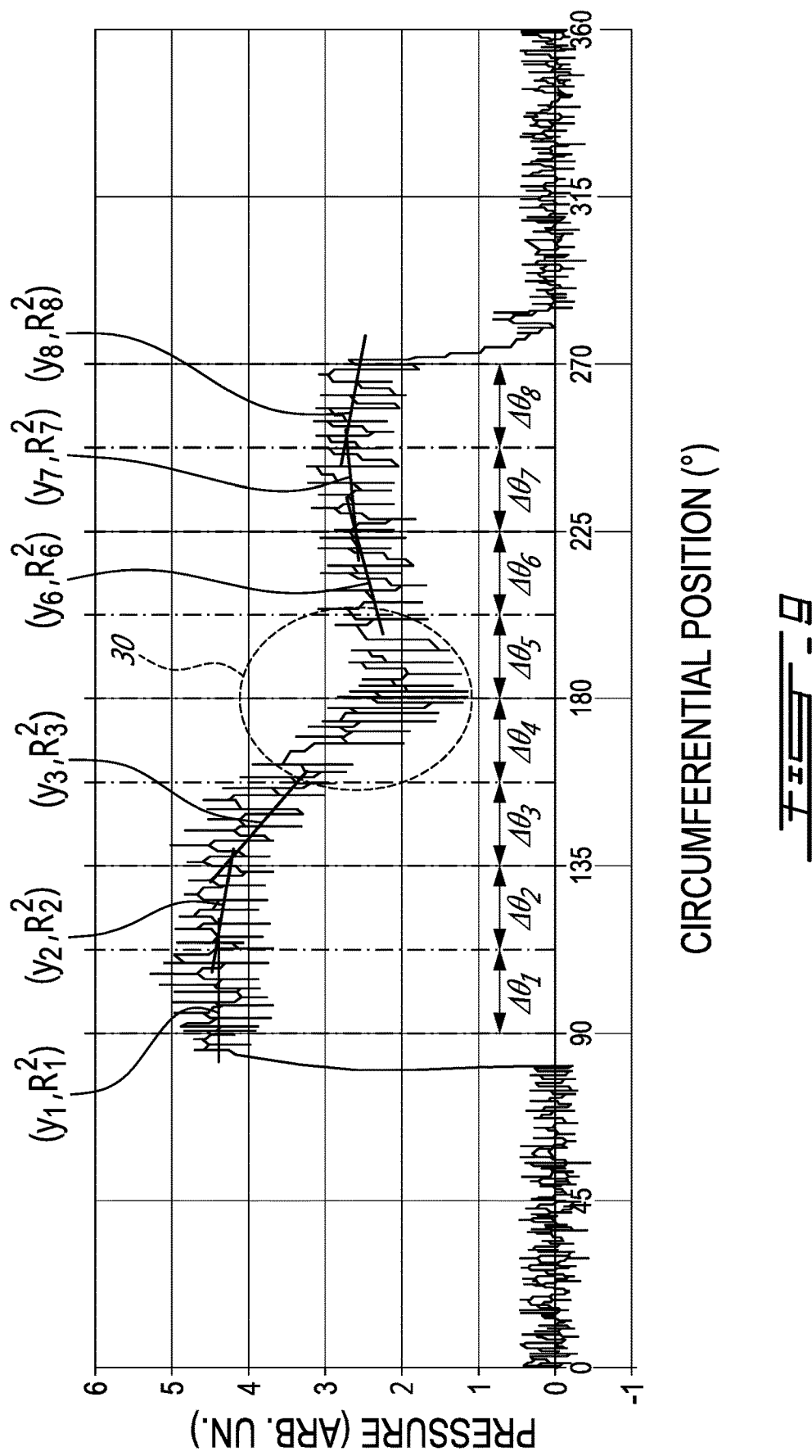
FIG. 9 is an example of a graph showing sets of pressure values as function of the circumferential position of the probe, with linear curves best fitted to the pressure values of some of the sets.

FIG. 9 shows a graph of pressure values of eight sets distributed in circumferential ranges $\Delta\ominus 1$, $\Delta\ominus 2$, $\Delta\ominus 3$, $\Delta\ominus 4$, $\Delta\ominus 5$, $\Delta\ominus 6$, $\Delta\ominus 7$, and $\Delta\ominus 8$ spanning from 90° to 270° taken during a single rotation. In this example, the reference data includes a linear curve best fitted to the pressure values of each one of some selected sets.

As can be seen, the linear curves y1, y2, y3, y6, y'7 and y8 are plotted for the pressure values of the first, second, third, sixth, seventh and eighth sets of circumferential ranges $\Delta\ominus 1$, $\Delta\ominus 2$, $\Delta\ominus 3$, $\Delta\ominus 6$, $\Delta\ominus 7$, and $\Delta\ominus 8$ in this example. Similarly to the embodiment described above, each of the linear curves y1, y2, y3, y6, y7 and y8 is characterized by a corresponding one of coefficients of determination $R_1^2$, $R_2^2$, $R_3^2$, $R_6^2$, $R_7^2$, $R_8^2$, from which deviations d1, d2, d3, d6, d7 and d8 can be derived at each rotation of the drum 14.

In some embodiments, the deviations d1, d2, d3, d6, d7 and d8 are compared to a common deviation value T. However, in some other embodiments, the deviations d1, d2, d3, d6, d7 and d8 are compared to a corresponding one of threshold values T1, T2, T3, T6, T7 and T8. As can be understood, it can be determined that the concrete constituents 12 are satisfactorily mixed when one or more of the deviations d1, d2, d3, d6, d7 and d8 are below their corresponding threshold values.

Figure 10:
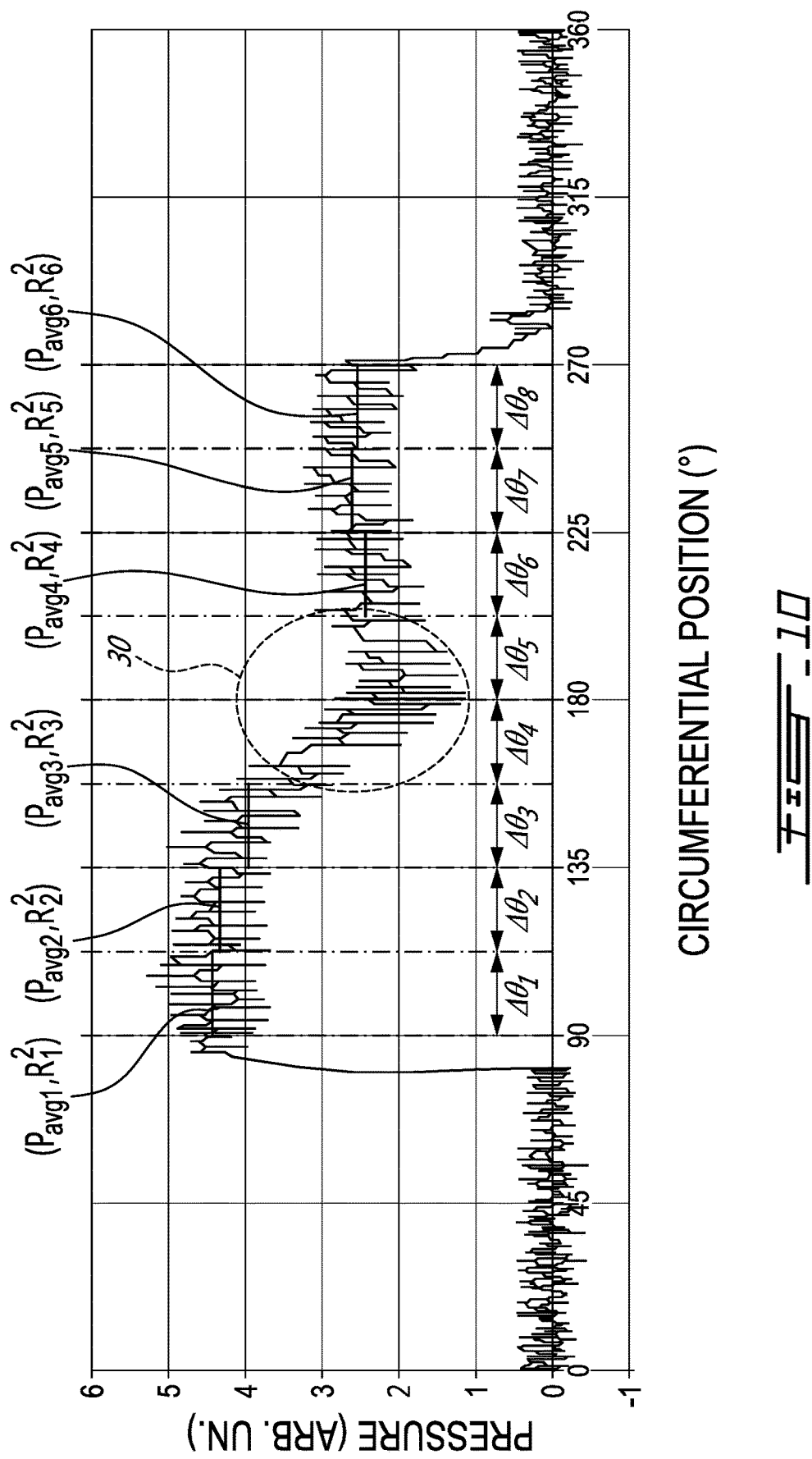
FIG. 10 is an example of a graph showing sets of pressure values as function of the circumferential position of the probe, with an average value of the pressure values of some of the sets being plotted as horizontal lines.

FIG. 10 shows a graph of pressure values of eight sets distributed in circumferential ranges $\Delta\Theta1$, $\Delta\Theta2$, $\Delta\Theta3$, $\Delta\Theta4$, $\Delta\Theta5$, $\Delta\Theta6$, $\Delta\Theta7$, and $\Delta\Theta8$ spanning from 90° to 270° taken during a single rotation to determine deviations from reference data. More specifically, the reference data are provided in the form of average pressure values indicative of an average of the pressure values of each one of some selected sets.

As can be seen, average pressure values $P_{avg1}$, $P_{avg2}$, $P_{avg3}$, $P_{avg6}$, $P_{avg7}$ and $P_{avg8}$ are plotted for the pressure values of the first, second, third, sixth, seventh and eighth sets in this example. As can be understood, the average pressure values $P_{avg1}$, $P_{avg2}$, $P_{avg3}$, $P_{avg6}$, $P_{avg7}$ and $P_{avg8}$ can be characterized by a corresponding one of coefficients of determination $R_1^2$, $R_2^2$, $R_3^2$, $R_6^2$, $R_7^2$, $R_8^2$ from which deviations d1, d2, d3, d6, d7 and d8 can be derived at each rotation of the drum 14 and then compared to a corresponding threshold value. Indeed, each coefficient of determination can be determined based on a linear curve having a null slope and having a y-intercept corresponding to the respective average pressure value.

Figure 11:
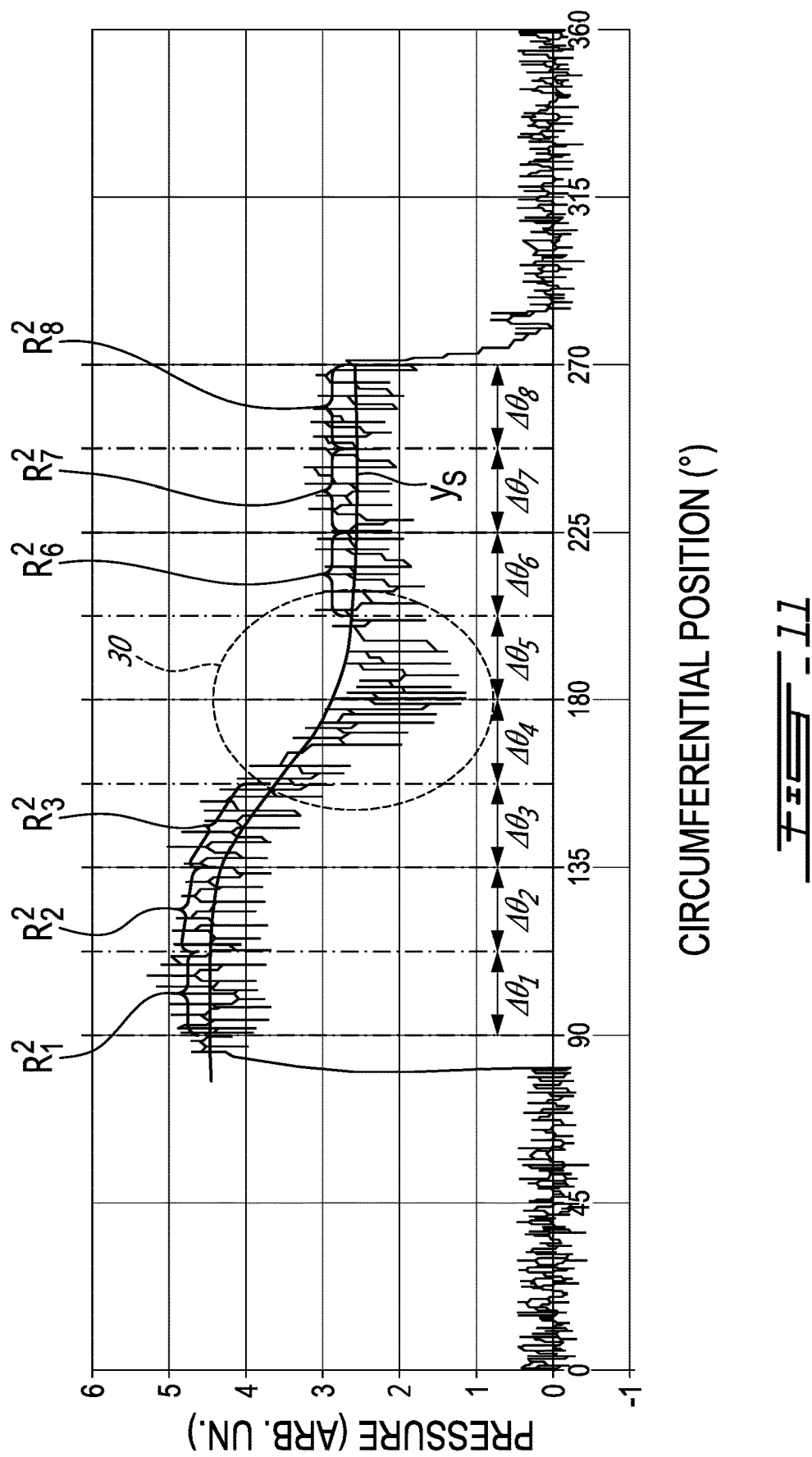
FIG. 11 is an example of a graph showing sets of pressure values as function of the circumferential position of the probe, with a sinusoidal curve best fitted to the pressure values of at least some of the sets.

FIG. 11 shows a graph of pressure values of eight sets distributed in circumferential ranges $\Delta\Theta1$, $\Delta\Theta2$, $\Delta\Theta3$, $\Delta\Theta4$, $\Delta\Theta5$, $\Delta\Theta6$, $\Delta\Theta7$, and $\Delta\Theta8$ spanning from 90° to 270° taken during a single rotation to determine deviations from reference data. In this example, the reference data is a sinusoidal curve $y_s$ best fitted to the pressure values of some of the eight sets of pressure values. More specifically, the sinusoidal curve $y_s$ is best fitted to the pressure values of the sets of circumferential ranges $\Delta\Theta1$, $\Delta\Theta2$, $\Delta\Theta3$, $\Delta\Theta6$, $\Delta\Theta7$ and $\Delta\Theta8$ which correspond to pressure values measured away from the bottom of the drum 14.

In this case, the pressure values are weight compensated but not buoyancy compensated, so it can be expected that the sinusoidal curve $y_s$ follows the variation of the pressure values due to a buoyancy force acting on the probe 22 such as shown and described with reference to FIGS. 6 and 7.

As can be understood, the reference data with which to compare the pressure values to determine the deviation depend on the way the pressure values are measured. Typically, the more the pressure values are compensated for weight or buoyancy either via a mechanical design of the probe 22 or post-processing of raw pressure values, the more simple the reference data are. For instance, in the case where the raw pressure values are weight compensated, one can expect the pressure values to vary such as shown in FIG. 5, and thus the reference data can be embodied as a reference value. However, in the case where the raw pressure values are only weight compensated, one can expect the pressure values to vary such as shown in FIGS. 6 and 7, and thus the reference data can be embodied as a curve best fitted to the pressure values. Accordingly, whether the pressure values have been compensated by a contribution of the weight of the probe at corresponding circumferential positions or compensated by a contribution of the buoyancy of the probe at corresponding circumferential positions will vary from an embodiment to another.

In the embodiments described with reference to FIGS. 8A and 8B, 9, 10 and 11, it was found convenient to ignore the pressure values taken proximate to a bottom of the drum 14, i.e. pressure values in the circumferential ranges $\Delta\Theta4$ and $\Delta\Theta5$, as the presence of the discrepancies 30 can prevent from obtaining satisfactory deviations even when the concrete ingredients 12 are already well mixed. Accordingly, it can be advantageous to use pressure values taken away from the bottom of the drum 14 in some situations.

Figure 12:
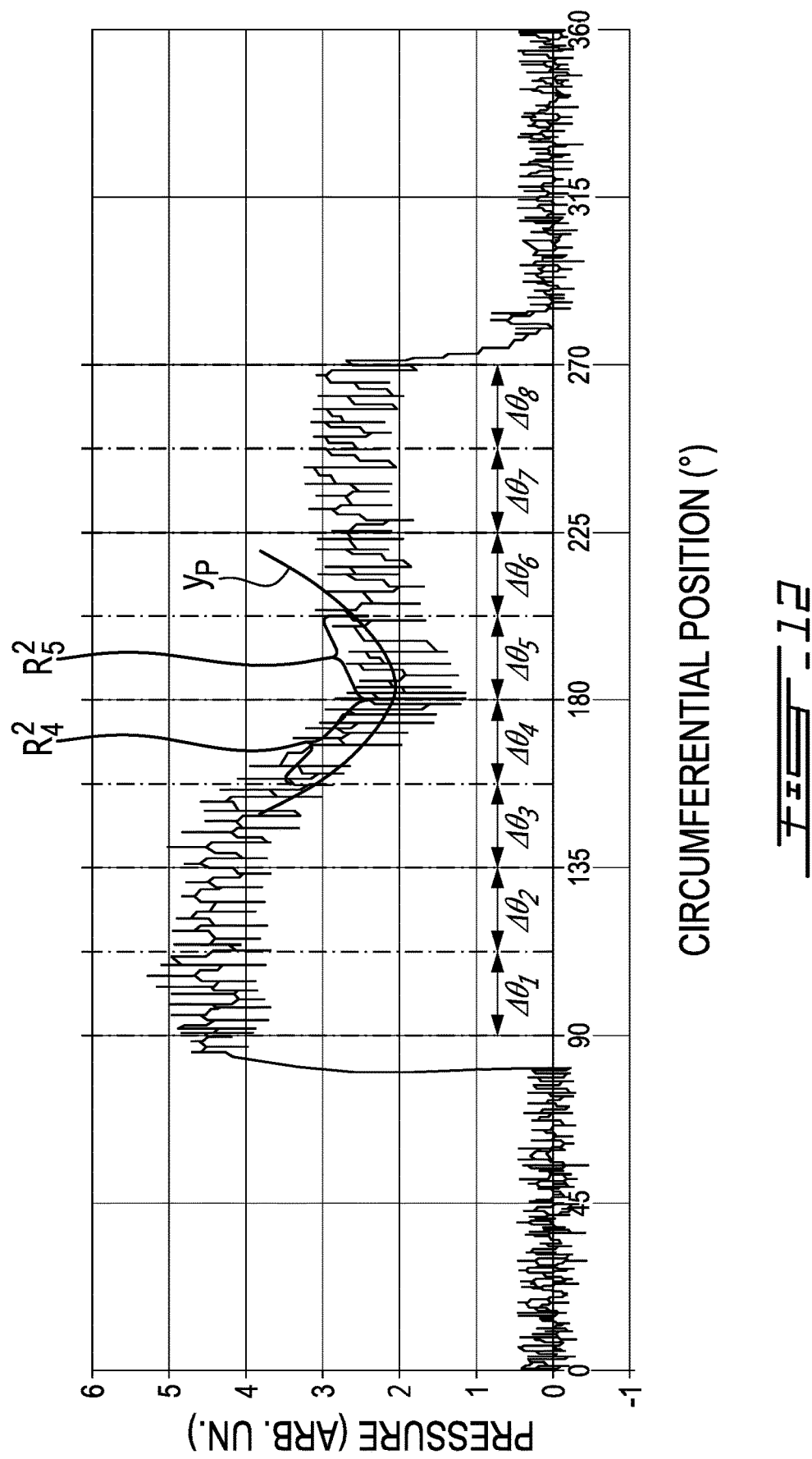
FIG. 12 is an example of a graph showing sets of pressure values as function of the circumferential position of the probe, with a parabolic curve best fitted to the pressure values of some of the sets.

FIG. 12 shows a graph of pressure values of eight sets distributed in circumferential ranges $\Delta\Theta1$, $\Delta\Theta2$, $\Delta\Theta3$, $\Delta\Theta4$, $\Delta\Theta5$, $\Delta\Theta6$, $\Delta\Theta7$, and $\Delta\Theta8$ spanning from 90° to 270° taken during a single rotation to determine deviations from reference data. In this example, the reference data is a parabolic curve $y_p$ best fitted to the pressure values of sets of pressure values which are located near the bottom of the drum 14, proximate to the discrepancies 30. More specifically, the parabolic curve is best fitted to the pressure values of the sets spanning in the fourth circumferential range $\Delta\Theta4$ and in the fifth circumferential range $\Delta\Theta5$. Accordingly, a deviation d4 can be determined from a coefficient of determination $R_4^2$ calculated using the pressure values of the fourth set and the parabolic curve $y_p$, and a deviation d5 can be determined from a coefficient of determination $R_5^2$ calculated using the pressure values of the fifth set and the parabolic curve $y_p$. Then, the deviations d4 and d5 can be compared to a corresponding threshold value to determine whether or not the concrete constituents are satisfactorily mixed or not.

As can be understood, the examples described above and illustrated are intended to be exemplary only. Although it is described that the probe can measure pressure values indicative of a normal pressure exerted on the probe, it is intended that the probe can measure pressure values indicative of shear pressure exerted on the probe in some other embodiments. For instance, the curve that are best fitted to the pressure values of a corresponding set may not be based on circumferential positions but rather based on point numbers. In another embodiment, the pressure values of at least two sets are used to determine whether or not the concrete constituents are satisfactorily mixed. In this embodiment, a first circumferential range of one of the two sets lies on one side of the drum relative to a sagittal plane of the drum and a second circumferential range of the other one of the two sets lies on one other side of the drum relative to the sagittal plane of the drum. In some embodiments, the first circumferential range is even opposite to the second circumferential range with respect to the sagittal plane of the drum. The scope is indicated by the appended claims.

What is claimed is:

1. A method for mixing concrete constituents comprising:
   rotating a drum having a probe mounted inside the drum and immerged in the concrete constituents being mixed inside the drum;
   receiving a first set of pressure values indicative of pressure exerted on the probe by the concrete constituents, the pressure values of the first set being taken at different circumferential positions of the probe during a single rotation of the drum;
   determining a deviation of the pressure values of the first set from reference data; and
   reducing a rotation speed of the drum upon determining that the deviation is lower than a threshold value.

2. The method of claim 1 wherein the first set of pressure values are successive pressure values measured when the probe is moved in a first circumferential range $\Delta\Theta1$.

3. The method of claim 2 further comprising receiving a second set of pressure values indicative of pressure exerted on the probe by the concrete constituents when the probe is moved in a second circumferential range $\Delta\Theta2$ during the single rotation of the drum, the second circumferential range being different from the first circumferential range, said determining comprising determining a deviation of the pressure values of the second set from corresponding reference data.

4. The method of claim 3 wherein said reducing the rotation speed of the drum is performed upon determining that the deviation of each of the sets is lower than the threshold value.

5. The method of claim 3 wherein said reducing the rotation speed of the drum is performed upon determining that the deviation of each of the sets is lower than a corresponding threshold value.

6. The method of claim 2 further comprising receiving at least three sets of pressure values indicative of pressure exerted on the probe by the concrete constituents when the probe is moved in corresponding circumferential ranges, the first circumferential range and the corresponding circumferential ranges being different from one another, said determining comprising determining a deviation of the pressure values of the at least three sets from corresponding reference data.

7. The method of claim 1 wherein the reference data include an average value of the pressure values of the first set, and the deviation is determined based on a deviation of the pressure values of the first set from the average value.

8. The method of claim 1 wherein the reference data include a curve fitted to the pressure values of the first set, and the deviation is determined based on a deviation of the pressure values of the first set from the curve.

9. The method of claim 8 wherein said determining the deviation includes determining a coefficient of determination R2 based on the pressure values of the first set and the curve.

10. The method of claim 8 wherein the curve is linear when the circumferential positions at which the pressure values of the first set are taken are away from a bottom of the drum.

11. The method of claim 8 wherein the curve is parabolic when the circumferential positions at which the pressure values of the first set are taken are proximate to a bottom of the drum.

12. The method of claim 1 wherein the circumferential positions at which the pressure values of the first set are taken are selected based on a volume of concrete constituents being mixed inside the drum.

13. The method of claim 1 wherein the pressure imparted on the probe further includes weight acting on the probe due to a weight of the probe, the pressure values of the first set having been compensated by a contribution of the weight of the probe at corresponding circumferential positions.

14. The method of claim 1 wherein the pressure imparted on the probe further includes buoyancy acting on the probe due to a volume of the probe when the probe is submerged in the concrete constituents, the pressure values of the first set having been compensated by a contribution of the buoyancy of the probe at corresponding circumferential positions.

15. The method of claim 1 wherein the pressure values of the first set are taken at different circumferential positions of the probe away from a bottom of the drum.

16. A system for mixing concrete constituents inside a drum, the system comprising:
   a probe mounted inside the drum, extending in a radial orientation of the drum and being moved circumferentially as the drum rotates, and onto which a pressure is imparted by resistance due to the movement of the probe in the concrete constituents by the rotation of the drum; and
   a computing device communicatively coupled with the probe, the computing device being configured for performing the steps of:
      receiving a first set of pressure values indicative of pressure exerted on the probe mounted inside the drum and immerged in the concrete constituents being mixed inside the drum, the pressure values of the first set corresponding to different circumferential positions of the probe during a single rotation of the drum;
      determining a deviation of the pressure values of the first set from reference data; and
      generating a signal based on a comparison between the deviation and a threshold value, wherein the signal generated by the computing device causes a rotation speed of the drum to be reduced.

17. The system of claim 16 further comprising a user interface communicatively coupled with the computing device, the user interface being configured to display instructions to reduce the rotation speed of the drum based on the signal generated by the computing device.

18. The system of claim 16 wherein the pressure values of the first set are taken at different circumferential positions of the probe away from a bottom of the drum.

19. A computer-implemented method for mixing of concrete constituents being mixed inside a drum, the computer-implemented method comprising:
   receiving a first set of pressure values indicative of pressure exerted on a probe mounted inside the drum and immerged in the concrete constituents being mixed inside the drum, the pressure values of the first set corresponding to different circumferential positions of the probe during a single rotation of the drum;
   determining a deviation of the pressure values of the first set from reference data; and
   generating a signal based on a comparison between the deviation and a threshold value, wherein the signal causes a rotation speed of the drum to be reduced.

* * * * *